United States Patent
Beyer et al.

(10) Patent No.: US 9,697,164 B2
(45) Date of Patent: Jul. 4, 2017

(54) METHOD AND CONTROL DEVICE FOR THE OPERATION OF A CONTACT-FREE TRANSMISSION SYSTEM FOR AN IO LINK

(71) Applicant: Balluff GmbH, Neuhausen a.d.F. (DE)

(72) Inventors: Matthias Beyer, Stuttgart (DE); Stephan Franz, Uhingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 43 days.

(21) Appl. No.: 14/708,523

(22) Filed: May 11, 2015

(65) Prior Publication Data

US 2015/0331827 A1    Nov. 19, 2015

(30) Foreign Application Priority Data

May 13, 2014  (DE) .................. 10 2014 106 752

(51) Int. Cl.
| | |
|---|---|
| *G06F 3/00* | (2006.01) |
| *G06F 13/42* | (2006.01) |
| *G06F 13/20* | (2006.01) |
| *G05B 19/418* | (2006.01) |
| *H04L 12/66* | (2006.01) |

(52) U.S. Cl.
CPC .......... *G06F 13/423* (2013.01); *G06F 13/20* (2013.01); *G05B 19/4185* (2013.01); *H04L 12/66* (2013.01)

(58) Field of Classification Search
CPC ..... H04L 12/66; G05B 19/4185; G06F 13/20; G06F 13/423
See application file for complete search history.

(56) References Cited

U.S. PATENT DOCUMENTS

| | | | |
|---|---|---|---|
| 7,340,548 B2 * | 3/2008 | Love .................. | G06F 13/4081 710/305 |
| 2004/0088594 A1 * | 5/2004 | Canagasaby .......... | H03L 7/0814 713/400 |
| 2009/0154626 A1 * | 6/2009 | Anderson ............... | H04L 7/002 375/360 |
| 2012/0110225 A1 * | 5/2012 | Wessling ................ | G04G 5/00 710/61 |
| 2015/0143008 A1 * | 5/2015 | Feinaeugle ....... | H04L 12/40032 710/110 |
| 2015/0143144 A1 * | 5/2015 | Balbierer .......... | H04L 12/40136 713/320 |

FOREIGN PATENT DOCUMENTS

DE    10 2012 009 494 A1    11/2013

OTHER PUBLICATIONS

"IO-Link Interface and System Specification" Version 1.1.2, Jul. 2013.*

(Continued)

*Primary Examiner* — Jing-Yih Shyu
(74) *Attorney, Agent, or Firm* — Collard & Roe, P.C.

(57) ABSTRACT

In a method and a control device for the operation of a transmission system for an IO link, wherein at least one cable-free transition between an IO link master and at least one IO link device is provided, and wherein the IO link device provides a minimal cycle time for a communication cycle, it is particularly provided that the minimal cycle time provided by the IO link device is increased in such a manner that a temporal delay caused by the cable-free transition is added to the minimal cycle time.

7 Claims, 4 Drawing Sheets

(56) References Cited

OTHER PUBLICATIONS

IEC 61131-9, Edition 1.0, Sep. 2013, "Programmable controllers—Part 9: Single-drop digital communication interface for small sensors and actuators (SDCI)," total of 576 pages.
ISO 15745-1, First edition, Mar. 1, 2003, "Industrial automation systems and integration—Open systems application integration framework—Part 1: Generic reference description," total of 40 pages.
ISO 15745-1 Amendment 1, Apr. 1, 2007, "Industrial automation systems and integration—Open systems application integration framework—Part 1: Generic reference description—Amendment 1," total of 16 pages.
ISO 15745-2, First Edition, Nov. 15, 2003, "Industrial automation systems and integration—Open systems application integration framework—Part 2: Reference description for ISO 11898-based control systems," total of 170 pages.
ISO 15745-3, First Edition, Nov. 15, 2003, "Industrial automation systems and integration—Open systems application integration framework—Part 3: Reference description for IEC 61158-based control systems," total of 276 pages.
ISO 15745-4, First Edition, Nov. 15, 2003, "Industrial automation systems and integration—Open systems application integration framework—Part 4: Reference description for Ethernet-based control systems," total of 132 pages.
ISO 15745-4 Amendment 1, Feb. 15, 2006, "Industrial automation systems and integration—Open systems application integration framework—Part 4: Reference description for Ethernet-based control systems—Amendment 1: PROFINET profiles," total of 56 pages.
ISO 15745-4 Amendment 2, Feb. 1, 2007, "Industrial automation systems and integration—Open systems application integration framework—Part 4: Reference description for Ethernet-based control systems—Amendment 2: Profiles for Modbus TCP, EtherCAT and ETHERNET Powerlink," total of 174 pages.
ISO 15745-5, First Edition, Feb. 1, 2007, "Industrial automation systems and integration—Open systems application integration framework—Part 5: Reference description for HDLC-based control systems," total of 96 pages.

\* cited by examiner

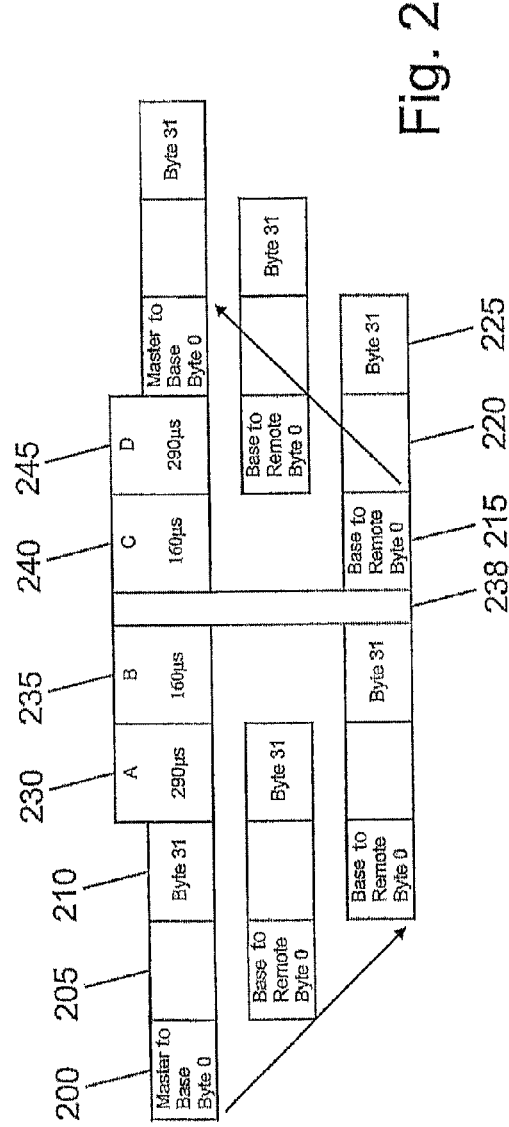
Fig. 2 (Prior Art)
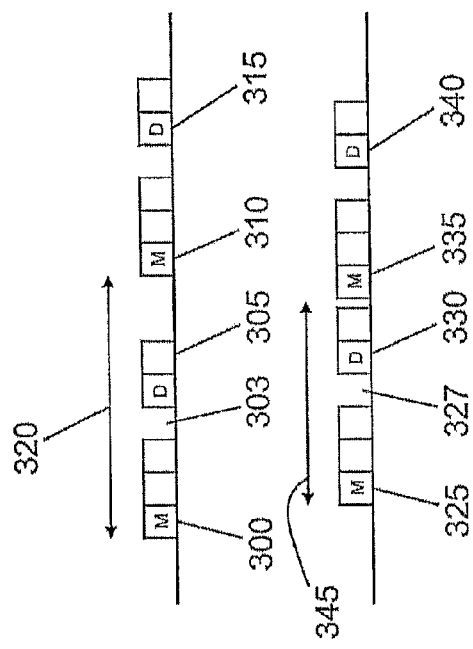
Fig. 3A (Prior Art)
Fig. 3B (Prior Art)

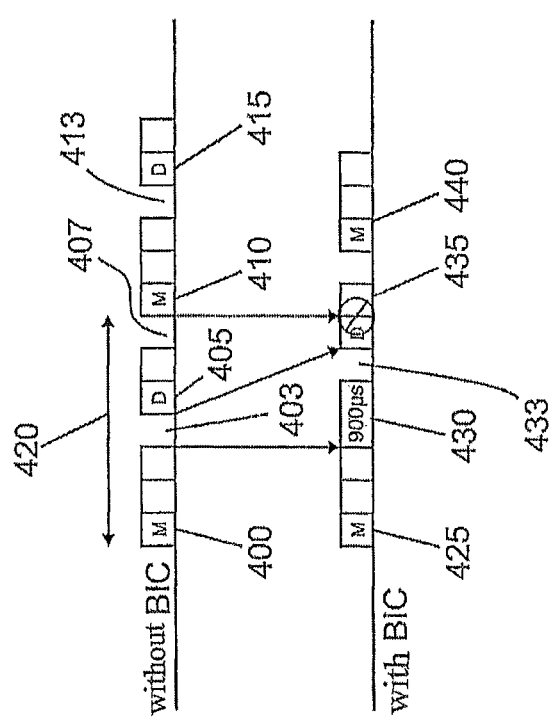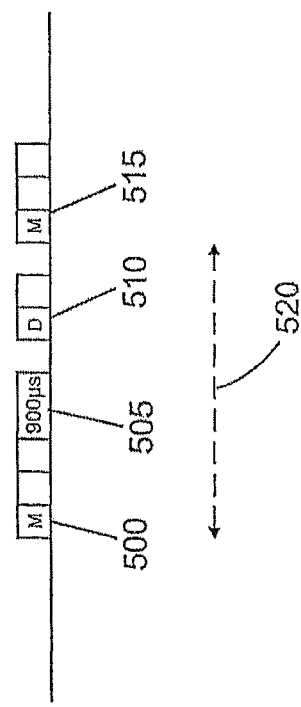

METHOD AND CONTROL DEVICE FOR THE OPERATION OF A CONTACT-FREE TRANSMISSION SYSTEM FOR AN IO LINK

CROSS REFERENCE TO RELATED APPLICATIONS

Applicant claims priority under 35 U.S.C. §119 of German Application No. 10 2014 106 752.5 filed May 13, 2014, the disclosure of which is incorporated by reference.

BACKGROUND OF THE INVENTION

Field of the Invention

The invention relates to a method and a control device for the operation of a transmission system for an IO link according to the independent claims.

State of the Art

In the field of machinery and plant engineering as well as in automation engineering numerous standardized field bus systems have proven to provide good alternatives to parallel individual wiring. Here, a plurality of so-called field bus modules is connected to a central control device via the field bus. In turn, terminal devices are connected to the field bus modules.

More recently, so-called "IO link" connections have been used for connecting the terminal devices to the field bus modules. Such an IO link as well as a method and a control device for the operation of such an IO link follow from DE 10 2012 009 494 A1. As is described therein, the field bus modules take over the role of an IO link master. As terminal devices (referred to as "IO link devices" in the following) sensors, actuators, display devices, operator devices, or smaller drives in machines may be used, for example.

In many assembly facilities the space requirements for the cable system and the switch box for the electrical installation often exceed the available installation space of the mechanical handling system. Almost always the costs for the work hours as well as for the material required for the installation of the hardware for signal transmission to the machine exceed the purchasing costs of the connected binary sensors and actuators.

In order to tackle this problem, a consortium of involved manufacturers has specified a standard for an intelligent sensor/actuator interface for which the mentioned term "IO link" is used, wherein it is planned to standardize it as an international open standard in the norm IEC 61131-9. According to this said IO link devices are described through description files IODD, IO link device description. In addition, IODD is to be standardized as a description language as an open standard in the norm ISO 15745.

Such an IO link provides a serial point-to-point connection for signal transmission between sensors and actuators and the TO level of the machine. In principle, an IO link transmits data between a said IO link master and a connected IO link device as the slave. As IO link masters, field bus modules as well as SPS (Sensor Planning Service) interface assembly groups are available.

In addition, such an IO link is downward compatible to binary standard sensors and generally uses unshielded three- or five-wire standard cables. While the field bus level is responsible for interconnecting individual machines or their components with the control system of the plant, the IO link is assigned to the machine or sensor-actuator level. The field bus level comprises most of the standardized field busses such as are generally used in machinery and plant engineering.

Commonly used field busses are, for example, PROFI-BUS-DP, Interbus, DeviceNet, CC-Link and CANopen. More recently, also Ethernet-based field bus standards such as PROFINET, EtherNet/IP, EtherCAT as well as Ethernet POWERLINK have been used. Field busses are used in a particularly advantageous manner for bridging greater distances between individual participants, which can lie between several 100 meters up to sometimes more than 10 km. However, it is problematic and disadvantageous that it is practically impossible to use these high-performance bus systems on the sensor-actuator level in an economically viable manner.

SUMMARY OF THE INVENTION

The invention is based on the objective to provide a said IO link for a contact-free transmission system which has at least one cable-free transition between an IO link master and at least one IO link device. Such a cable-free transition can be carried out by means of inductive coupling, e.g. by means of a per se known "Balluff Inductive Coupler" (BIC). However, the kind of coupling is not of importance in the present case, so that a capacitive coupling or an optical transmission or a radio transmission is also possible.

The invention is now based on the insight that within an IO link communication cycle, a transition between the transmission media, i.e. the cable-based and the contactless communication, occurs multiple times, preferably four times. Each of the said media transitions results in a delay of the respective signal that is to be transmitted.

Moreover, the communication in a transmission system as it is concerned here occurs in units of data bits or data bytes, and as a result the delay in each media transition amounts to at least one or multiple bit or byte lengths.

Such a delay is not admissible in an IO link communication, as hereby the pause between two respective transmissions cycles is shortened too much, or in the most adverse case the transmissions cycles even overlap, which may lead to an interruption of the communication. In order to avoid this, the invention suggests to manipulate a minimal cycle time (so-called "MinCycleTime") which is transmitted by the IO link device to the IO link master in such a manner that the temporal delay of the BIC system is added on top of the MinCycleTime.

In particular it is suggested that the communication between the IO link master and an IO link device (slave) is monitored and an inquiry of the master with regard to the MinCycleTime is detected, and that the associated response of the IO link device is masked out or not transmitted back to the IO link master, meaning that it is intercepted. Instead of the IO link device the MinCycleTime inquiry by the IO link master or a BIC coupler is responded to in such a manner that the MinCycleTime received from the IO link device plus the delay caused by the BIC is transmitted to the IO link master, whereby the said shortening of the pause between the transmission cycles is effectively avoided.

Since there are no interferences into the IO link communication other than the said interferences according to the invention, the communication is conforming with the IO link specification from the perspective of an IO link device, so that all IO link devices can be operated in a transparent manner, and particularly independently of the manufacturer, at a BIC coupler as it is concerned here.

If the said monitoring of the transmission of the MinCycleTime as well as the said corresponding interferences into the transmission protocol are performed by the said BIC coupler itself, this has the advantage that, as the causing agent of the delay, the BIC coupler knows the amount of the delay or can easily determine the same.

The method according to the invention facilitates a transparent data transfer or communication, which facilitates an unrestricted IO link communication from the perspective of an IO link device. This transparency is particularly achieved through the adjustment of an IO link parameter according to the invention, whereby it is ensured that said influences of the contactless transmission on the time behavior of the IO link are compensated.

The method according to the invention further facilitates a bidirectional communication in a contact-free transmission system as it is concerned here, whereby apart from the transmission of sensor signals also an aforementioned actuating device may be accessed.

The method according to the invention and the control device are particularly suited for the operation of a said IO link, since from the perspective of the IO link device a complete conformity with the aforementioned IO link standard can be achieved.

BRIEF DESCRIPTION OF THE DRAWINGS

Exemplary embodiments of the invention are shown in the drawings and are explained in more detail in the subsequent description.

In the drawings,

FIG. 2 shows a time chart of a stepwise transparent communication occurring in a transmission system as it is shown in FIG. 1.

FIGS. 3A, 3B show a typical telegram structure of an IO link communication occurring in an IO link transmission system that has no contactless transition.

FIGS. 4A, 4B illustrate a case of collision in a telegram structure, which the invention is based on, according to FIGS. 3A and 3B in an IO link transmission system that has a contactless transition.

FIG. 5 shows a telegram structure that is modified according to the invention as compared to FIGS. 4A and 4B.

DETAILED DESCRIPTION OF THE PREFERRED EMBODIMENTS

Figure 1:
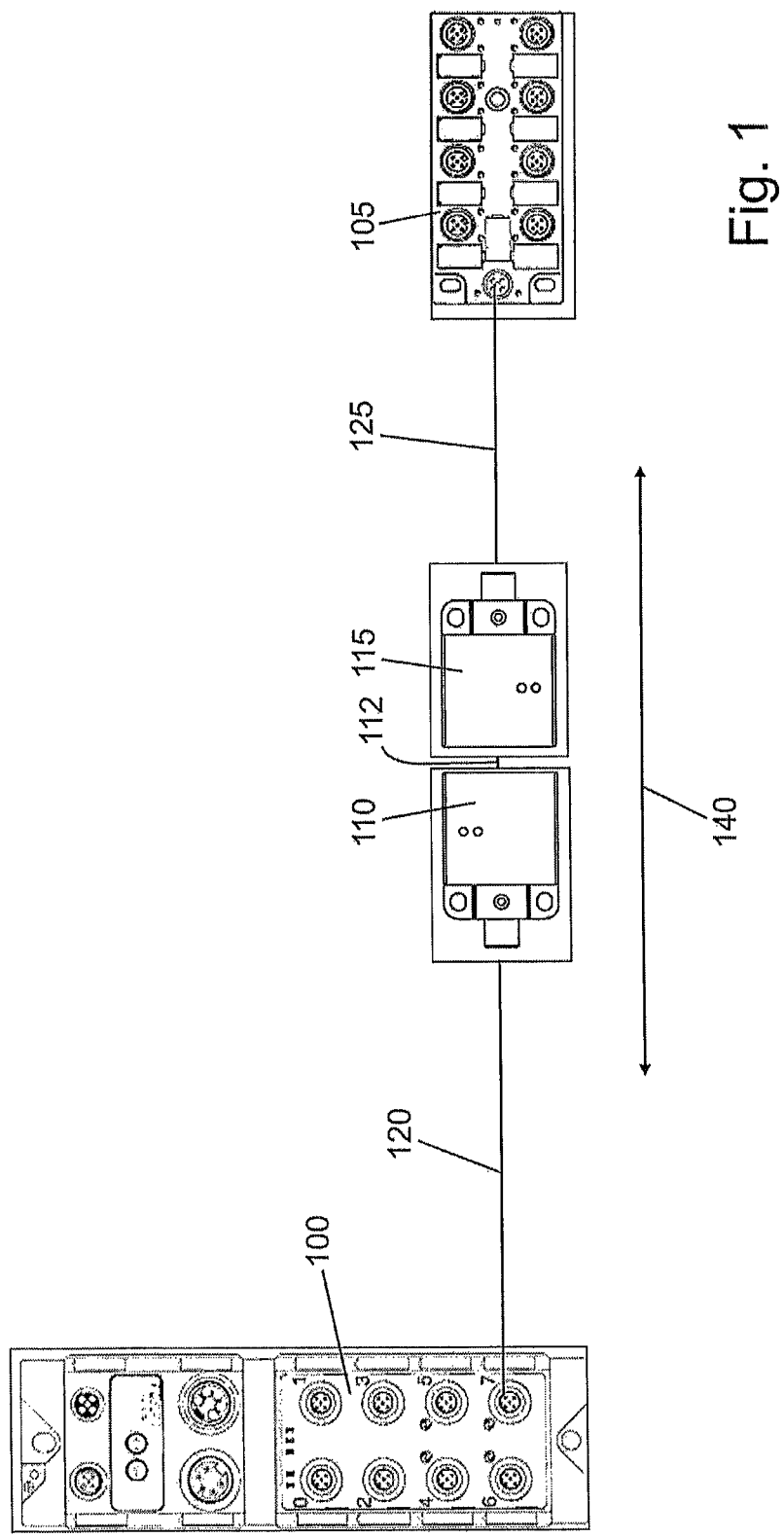
FIG. 1 shows an IO link transmission system with a contactless transition as it is concerned here.

The transmission system shown in FIG. 1 comprises an IO link master 100 and an IO link device 105 (referred to as "IOL device" in the following) that communicates with the IO link master 100 (referred to as "IOL master" in the following). In particular, the IO link comprises two contactless BIC couplers 110, 115 that communicate with each other, which inductively exchange data via an air transition 112 in a manner that is per se known. This data exchange is carried out according to the arrow 140 in a bidirectional manner.

The first coupler 110 ("base" coupler) that is assigned to the IOL master 100 is connected to the master 100 via a wire or cable-based line 120. The second coupler 115 ("remote" coupler) that is assigned to the IOL device 105 is also communication-technologically connected to the device 105 via a cable-based line 125.

In FIG. 2, a communication that is typically occurring in a transmission system according to FIG. 1 is shown by using (horizontally arranged) data blocks, so-called "telegrams", that are shown over time.

In the present exemplary embodiment, a telegram comprises respectively three sequentially transmitted data blocks (so-called "bytes"). Thus, the IOL master 100 first sends three blocks 200, 205, 210, namely one start block 200 to initiate communication with the base-coupler 110. This is followed by one or possibly multiple data blocks 205, which contain the actual "payload" to the IOL device 105. The communication with the BIC coupler 110 is concluded with a CRC end block 210, in the present case of one byte 31, which serves for error control. The data length or the number of these data blocks may vary depending on the IOL device. According to the IO link, the data length lies in the range of 1 and 66 Byte.

In parallel, temporarily offset by one data block, the contact-free transmission of the three data blocks 200-210 between the first BIC coupler 110 and the second BIC coupler 115 occurs. This wireless transmission step leads to a first delay 230 amounting to approximately 290 μs. Also in parallel, temporarily offset by another data block, the data blocks 200-210 are transmitted in a cable-based manner by the second BIC coupler 115 to the IOL device 105, by which a second delay 235 of approximately 160 μs is caused. The said delay times are only exemplary, however, as the numerical example implies, the delay in a wireless or contactless transmission is mostly higher than in a wire- or cable-based transmission.

After a relatively short third delay 238, which is caused by the response time of the IOL device 105 itself, the IOL device 105 sends its response, which in the present exemplary embodiment again corresponds to a telegram that is comprised of three data blocks 215, 220, 225. The start block 215 first initiates a wire- or cable-based communication 125 with the second BIC coupler 115, wherein a fourth delay 240 in the amount of approximately 160 μs results. The middle block 220 again corresponds to (is representative of) one or multiple data blocks for the actual payload, and the termination block 225 again corresponds to the said one byte 31.

In the subsequent wireless or contactless transmission between the second BIC coupler 115 and the first BIC coupler 110, a fifth delay 245 arises, namely again in amount of 290 μs.

As can be seen in FIG. 2, a total delay 230-245 of about 900 μs accordingly arises in the entire communication cycle.

A telegram structure used in an IO link transmission system without contact-free transition as it is known, i.e. without said BIC coupler 110, 115, is shown in FIG. 3A. In FIGS. 3A and 3B as well as the following FIGS. 4A, 4B, and 5, data blocks that are generated or communicated by an IOL master are identified by the letter "M", and data blocks generated or communicated by an IOL device by the letter "D" (for device).

In the present exemplary embodiment, the IOL master sends an inquiry 300, in the present case formed by three data blocks, to the IOL device, whereupon the IOL device replies to the inquiry 300 with a response telegram 305 consisting of two data blocks. This communication is equivalent to a half duplex operation, since the data blocks are not exchanged synchronously, but in alternating operation, and thus are not transmitted simultaneously.

Between the inquiry 300 and the response 305, as has already been shown in FIG. 2, a short delay 303 with the bit length of 1-10 Bit occurs in the present case, wherein 1 TBit corresponds to the length of a bit. In the exemplary embodiment, the bit lengths of the inquiry telegram 300 and the response telegram 305 are 1 to 66 bytes, respectively. The minimal cycle time ("MinCycleTime") for the communication cycle 300, 303, 305 corresponds to the length of the arrow 320. Only after this, the IOL master can again release an inquiry telegram 310, which is then accordingly replied to 315 by the IOL device.

The MinCycleTime is recorded as a parameter in the IOL device and is read out by the IOL master. In this exemplary embodiment, a value of the MinCycleTime has been recorded by the manufacturer of the IOL device, which approximately corresponds to the duration of the data transfer. The time gap 327 between a response 330 of the IOL device and a new inquiry 325 of the IOL master consequently becomes smaller. This results in a MinCycleTime of the length corresponding to the indicated arrow 345. Directly afterwards, the IOL master (M) can again release another inquiry 335, which is then replied to 340 by the device (D) in the manner already described.

FIGS. 4A and 4B show how in an IO link transmission system with a contactless transition, i.e. a system with said BIC couplers 110, 115, an aforementioned temporal collision or overlapping of an inquiry on the part of the IOL master and a corresponding response of the IOL device can occur.

In FIG. 4A, a telegram structure of such an IOL master/IOL device communication is again shown, and namely first for a transition-free transmission system without said couplers 110, 115. Here, it is the IOL master that is sending 400 to the IOL device, which replies 405 after a short response or delay time 403 of 1 to 10 TBit. After the MinCycleTime 420, which has started with the telegram inquiry 400 on the part of the master and which ends with a further short response or delay time 407, has elapsed, another telegram inquiry 410 by the IOL master ensues, which again is replied to by the IOL device with the response telegram 415 after a short response or delay time 413 on the part of the IOL device.

As has already been described and illustrated in FIG. 4B, a contact-free transition with couplers 110, 115 leads to an additional delay 430 of e.g. 900 μs which occurs following the inquiry by the master 425. As indicated by the gap 433, the sending of the response telegram 435 on the part of the IOL device is therefore delayed. From a comparison with FIG. 4A it may be seen, that it thus comes to a temporal overlapping, in the present case of the second data block of the response telegram, with another telegram inquiry 410 (or 440) made by the IOL master that has already been released according to the MinCycleTime.

Therefore, the principle applies that it comes to a message or telegram collision, when the pause or interruption between a response of the IOL device and a subsequent inquiry of the IOL master is shorter than the delay caused by the contactless transition.

FIG. 5 shows a telegram structure 500, 505, 510, 515 that is changed or modified according to the invention as compared to FIGS. 4A and 4B, with a modified MinCycleTime as compared to FIG. 4B, according to the arrow 520. The MinCycleTime, which is initially recorded in the IOL device in a manner that is per se known and that is read out by the IOL master from the IOL device or is communicated by the IOL device, is intercepted or detected by the BIC coupler 115 in the present exemplary embodiment and manipulated or modified by adding the delay caused by the contactless transition, i.e. in the present case the said 900 μs. In this manner, a longer time period of the MinCycleTime results as compared to that shown in FIG. 4A. Through this measure, a described collision is effectively avoided, wherein the modified time lapse (timing) according to the invention conforms to the specification of the IO link particularly from the perspective of the IOL device.

Figure 6:
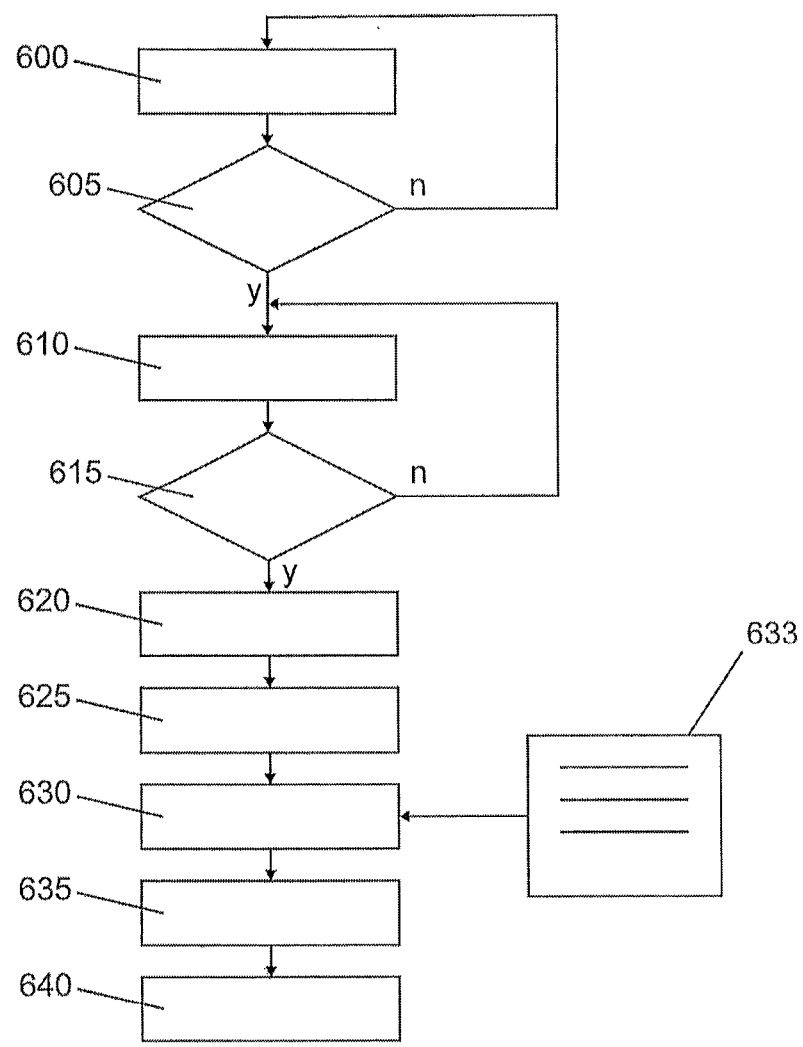
FIG. 6 shows an exemplary embodiment of the method according to the invention by reference to a flow chart.

An exemplary embodiment of the method according to the invention is now described by referring to the flow chart shown in FIG. 6. The shown routine is implemented in the present exemplary embodiment in the couplers 110, 115 or in a control device that is working together with the couplers 110, 115. According to program loop 600, 605, the routine is first in an idle (standby) mode and is activated as the IOL master sends an inquiry to an IOL device via a communication channel with a said contactless transition. After the routine has been activated, the communication channel is again monitored 610 in a program or test loop in the present exemplary embodiment, and it is waited 615 until a response message of the IOL device has been recorded on the communication channel after the lapse of the MinCycleTime following the master inquiry. In this case, the response message (or the response telegram) is prevented 620 from being forwarded to the IOL master and the value of the MinCycleTime that is suggested by the IOL device is extracted 625 from the message.

In the subsequent step 630, a delay value for the contactless transition is retrieved, and namely from the data storage device 633, a table or the like. This delay value is then added 635 to the MinCycleTime (MCT) value suggested by the IOL device, in order to obtain a modified value $MCT_{mod}$. This modified MCT value is then forwarded 640 to the IOL master, which uses the modified MCT value as a basis for the subsequent time control of the IO link communication between the IOL master and the respective IOL device.

What is claimed is:

1. A method for operating a transmission system for an IO link, wherein at least one cable-free transition between an IO link master and at least one IO link device is provided, and wherein the IO link device provides a minimal cycle time for a communication cycle, wherein the minimal cycle time that is provided by the IO link device is increased in such a manner that a temporal delay caused by the cable-free transition is added to the minimal cycle time, comprising the following steps:
monitoring the communication between the IO link master and the at least one IO link device;
detecting an inquiry of the IO link master with regard to the minimal cycle time to the at least one IO link device;
intercepting a corresponding response of the IO link device;
increasing the minimal cycle time so intercepted by the temporal delay caused by the cable-free transition; and
communicating on the minimal cycle time so increased.

2. The method according to claim 1, wherein the cable-free transition is carried out by inductive or capacitive coupling or by optical transmission or radio transmission.

3. The method according to claim 1, wherein the steps are performed by the IO link master.

4. The method according to claim 1, wherein the steps are performed by an inductive coupler.

5. The method according to claim 1, wherein the minimal cycle time that is increased by the temporal delay caused by the cable-free transition is forwarded to the IO link master and is used as a basis for the subsequent time control of the IO link communication between the IO link master and the at least one IO link device.

6. A control device for operating a transmission system for an IO link, in which at least one cable-free transition between an IO link master and at least one IO link device is provided, wherein the IO link device provides a minimal cycle time for a communication cycle, further comprising at least one of a calculator or a control for increasing the minimal cycle time provided by the IO link device so that a temporal delay caused by the cable-free transition is added to the minimal cycle time, and wherein the control device further comprises a communication monitor monitoring the communication between the IO link master and the at least one IO link device, a detector detecting an inquiry of the IO link master with regard to the minimal cycle time, a response interceptor intercepting a corresponding response by the at least one IO link device, a calculator calculating a modified minimal cycle time based on the delay caused by the cable-free transition, and a cycle time communicator communicating the correspondingly modified minimal cycle time.

7. The control device according to claim 6 for a transmission system for an IO link, in which the cable-free transition is carried out by inductive or capacitive coupling or by optical transmission or radio transmission.

* * * * *